United States Patent [19]
Alofsin

[11] 3,738,330
[45] June 12, 1973

[54] PROTECTIVE COVERING DEVICE FOR ANIMALS

[76] Inventor: Sylvia June Alofsin, 4110 West 98th Street, Overland Park, Kans. 66207

[22] Filed: May 24, 1971

[21] Appl. No.: 146,244

[52] U.S. Cl. ............................................. 119/143
[51] Int. Cl. .......................................... A01k 21/00
[58] Field of Search ........................... 119/143, 95; 128/169

[56] References Cited
UNITED STATES PATENTS

| | | | |
|---|---|---|---|
| 3,141,443 | 7/1964 | Huey | 119/143 |
| 3,568,670 | 3/1971 | Gaylord, Jr. | 128/169 |
| 3,211,132 | 10/1965 | Hersh | 119/143 |
| 3,298,366 | 1/1967 | Moore et al. | 128/169 X |

*Primary Examiner*—Hugh R. Chamblee
*Attorney*—Reilly & Lewis

[57] ABSTRACT

A belt-like protective covering device, for an animal and specifically adapted as a training covering for a male dog, includes a cover portion suited for covering a selected area of the body of the animal includes relatively narrow straps secured to the cover portion and adapted to extend around the body of the animal and arranged to releasably fasten at the free ends to form a closed loop, the closed loop being adapted to flex with body movement of the animal while the cover portion is firmly retained in place.

5 Claims, 4 Drawing Figures

PATENTED JUN 12 1973 3,738,330
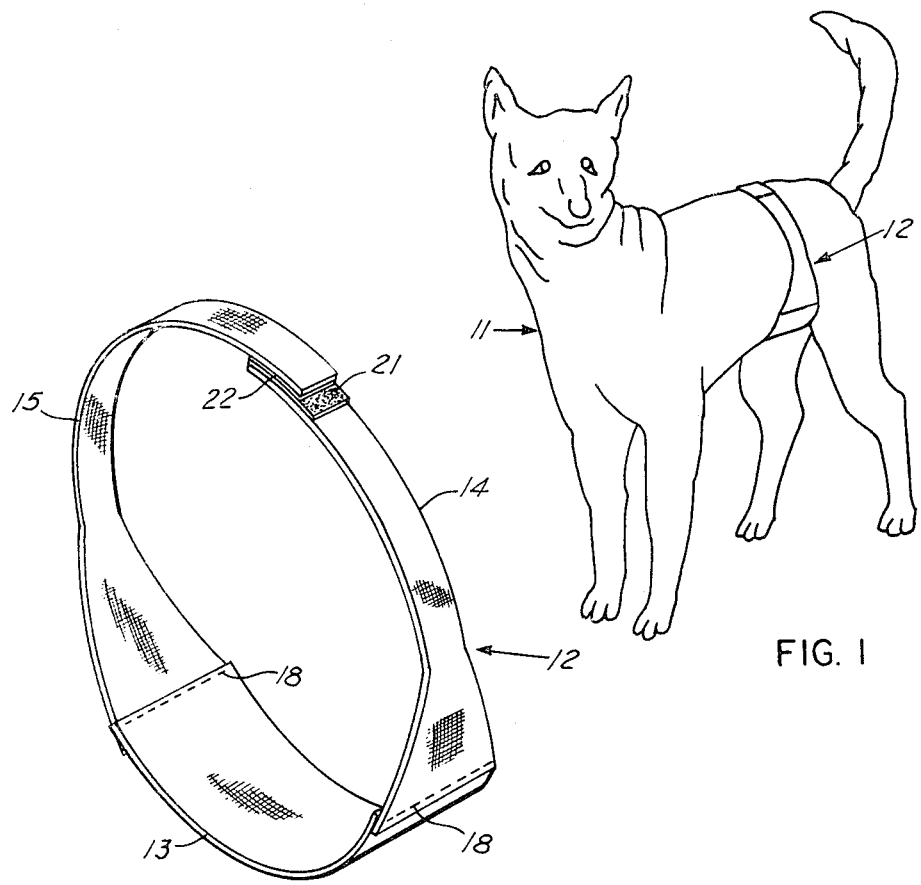
FIG. 1
FIG. 2
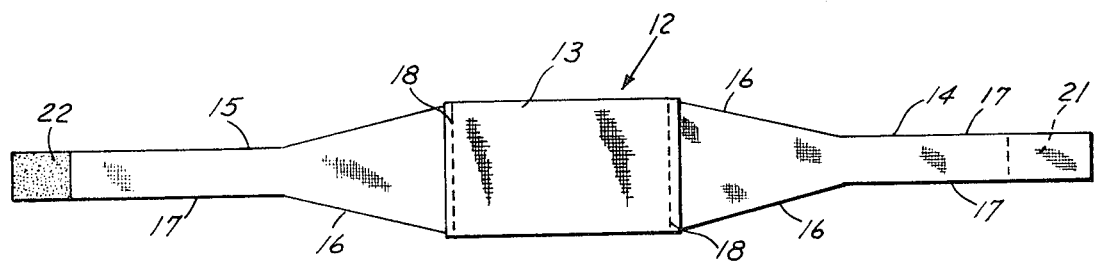
FIG. 3
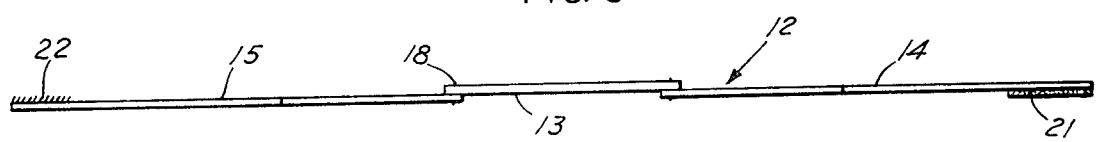
FIG. 4
INVENTOR
SYLVIA JUNE ALOFSIN
BY
Reilly and Lewis
ATTORNEYS

PROTECTIVE COVERING DEVICE FOR ANIMALS

This invention relates to protective type devices for animals and more particularly to a removable protective covering device for effectively covering selected areas of the body of a male dog such as the reproductive organ to prevent wetting or sexual intercourse during required time intervals.

Prior protective devices specifically adapted for covering selected areas of the body of an animal have generally taken the form of garments which require a substantial amount of material and workmanship and cover a substantial part of the animal. Some attempt has also been made to use a relatively wide inflexible band adapted to extend around the body of an animal and carrying an inflexible pan. Such prior devices are somewhat cumbersome to remove and replace as well as tending to be uncomfortable to the animal to which it is applied.

Accordingly, it is an object of this invention to provide a relatively simple, durable protective covering device for animals which is relatively inexpensive to manufacture, is washable, reusable and is relatively easy to apply and remove.

Another object of this invention is to provide a novel protective covering device for animals and particularly for the reproductive organ of a male dog in the nature of a relatively narrow strip or belt which forms a closed band around the body of the animal, causes a minimum of discomfort to the animal and is not readily displaced or removed by the animal.

Yet a further object of this invention is to provide an improved belt-like covering device for male dogs characterized by having a flexible cover portion and relatively long, narrow straps connected to the cover portion which releasably fasten at the free ends to form a closed loop around a portion of the body of the dog and across the rear back portion thereof.

In a preferred embodiment of the invention shown there is provided a removable protective covering device on a male dog including a cover portion preferably made of a flexible, bandage-type material, a pair of relatively thin straps preferably made of vinyl material secured at one end to the end portions of the cover member and adapted to extend around the body of the dog and having fastening members, preferably of the Velcro-type, which secure the free ends of the straps together to form a closed loop. This closed loop assembly engages only a relatively narrow circular strip of the body of the dog, with the cover portion flexing to allow the cover portion and closed loop assembly to flex with body movement of the dog.

Other objects, advantages and capabilities of the present invention will become more apparent as the description proceeds taken in conjunction with the accompanying drawings, in which:

FIG. 1 is a perspective view showing a dog having the protective covering device mounted in position thereon;

FIG. 2 is a perspective view of the protective covering device shown in FIG. 1 with the free ends of the straps fastened together to form a closed loop;

FIG. 3 is a plan view of the device shown in FIGS. 1 and 2 in a flat condition; and FIG. 4 is a side elevational view of the device shown in FIG. 3.

Referring now to the drawings, there is illustrated a male dog 11 on which is mounted a protective covering device 12 embodying features of the present invention. The protective covering device is a relatively narrow, belt-like assembly including a cover portion 13 which is relatively narrow and generally rectangular in shape together with a pair of elongated relatively narrow strap portions 14 and 15 which are secured to the cover portion and are adapted to extend around the body of the animal to hold the cover portion in place. The strap portions have inner ends approximately the same width as the cover portion and overlap the cover portion along the outer surface of each strap portion. Each strap portion has an inner tapered section with a pair of outwardly convergent side edges 16 and an outer end section with a pair of parallel side edges 17. The strap portions 14 and 15 are shown as being secured to the cover portion by stitching represented at 18.

Fastening means are provided on the free ends of the strap portions preferably in the form of Velcro-type members 21 and 22. Member 21 is generally rectangular in shape and a substantial length thereof will allow substantial adjustment in the size of the loop. Member 21 is made of a fuzzy wool-like synthetic material. Member 22 is also rectangular in shape and is made of a series of rows of upstanding rigid loops which when placed against the member 21 form a secure fastening for the free ends of the strap portions.

As best seen in FIG. 1, the device is positioned on the male dog by placing the cover portion of the device over the selected portion of the body, which in FIG. 1 is the male organ for training purposes so that the dog will not wet during training and is also effective to prevent breeding with another animal. Other possible uses thereof are to cover selected areas of the body after surgery and the like. The strap portions are drawn around the body with the fastening means being brought together across the back portion of the animal.

The cover portion 13 is preferably made of a flexible bandage-type woven material capable of flexing and also absorbing moisture and allows the closed loop formed by bringing the fastening means together to flex with the body movement of the animal. The relatively narrow nature of the belt-like loop assembly allows the assembly to grip the animal but the cover portion will flex sufficiently to allow the entire loop assembly to flex with the body movement of the animal.

The strap portions are preferably made of a relatively inflexible vinyl material which is durable, easy to cut and sew to the cover portion and does not tend to slide along the body of the animal and is washable and reusable. While it is understood that other fastening means such as buckles may be used to secure the free ends of the strap in place across the back of the animal, the Velcro-type fastening arrangement has been found to be highly effective in that it is easy to secure the straps to the cover portion which is usually done by stitching, easy to apply and is readily adjustable to a different size for a variety of animal sizes.

Although the present invention has been described with a certain degree of particularity, it is understood that the present disclosure has been made by way of example and that changes in details of structure may be made without departing from the spirit thereof.

What is claimed is:

1. A releasable belt-like protective covering device for male dogs comprising an elongated, relatively narrow belt-like assembly including:

a generally rectangular-shaped center pad made of a flexible moisture-absorbent bandage-type woven material adapted to overlay the reproductive organ of a male dog, relatively narrow straps narrower in width than the center pad secured to the opposite ends of said center pad made of a inflexible vinyl material and adapted to extend around the body of the dog and form a closed loop; and cooperative Velcro-type fastening members on the free end portions of the straps to hold the center pad and straps in the closed loop and releasably secure the center pad in place on the dog with the only flexure in the closed loop being in the flexible center pad.

2. A protective covering device for animals such as dogs comprising:

a center pad sized to overlay a selected area of the body, said pad, being moisture-absorbent to absorb moisture from the animal's body and flexible to flex with body movement of the animal, a pair of relatively narrow, inflexible straps secured at opposite edges of the center pad adapted to extend around a portion of the animal and form a closed loop, and cooperative Velcro-type fastening members carried on the free end portions of the straps to releasably secure the center pad and straps in the closed loop and the center pad in place with the only flexure in the closed loop being along the flexible center pad.

3. A protective covering device as set forth in claim 2 wherein said center pad is made of flexible bandage-type woven material.

4. A protective covering device as set forth in claim 2 wherein said center pad is of greater width than said straps, said straps each include an inner tapered section with outwardly convergent side edges and an outer end section with parallel side edges forming extensions of the convergent side edges.

5. A protective cover assembly as set forth in claim 2 wherein said straps are made of a vinyl material.

* * * * *